(12) United States Patent
Laurent et al.

(10) Patent No.: US 7,676,027 B2
(45) Date of Patent: Mar. 9, 2010

(54) SYSTEMS AND METHODS TO SEND AND RECEIVE ENCRYPTED DTMF DIGITS IN A DATA FLOW

(75) Inventors: Pierre Laurent, Clare (IE); Mehdi Hassane, Limerick (IE)

(73) Assignee: Intel Corporation, Santa Clara, CA (US)

( * ) Notice: Subject to any disclaimer, the term of this patent is extended or adjusted under 35 U.S.C. 154(b) by 1142 days.

(21) Appl. No.: 11/172,628

(22) Filed: Jun. 30, 2005

(65) Prior Publication Data

US 2007/0025331 A1 Feb. 1, 2007

(51) Int. Cl.
*H04M 1/64* (2006.01)
(52) U.S. Cl. .................. 379/88.13; 379/88.2; 380/266; 380/277; 455/564; 702/70; 705/70
(58) Field of Classification Search .............. 379/93.33, 379/283, 406.08, 386, 88.13, 88.2; 704/226; 370/526; 84/688; 380/266, 277; 455/564; 702/70; 705/70
See application file for complete search history.

(56) References Cited

U.S. PATENT DOCUMENTS

| | | | | |
|---|---|---|---|---|
| 3,617,604 A | * | 11/1971 | Adachi | 84/688 |
| 4,484,035 A | * | 11/1984 | Graham et al. | 702/70 |
| 4,689,760 A | * | 8/1987 | Lee et al. | 370/526 |
| 5,208,756 A | | 5/1993 | Song | |
| 5,222,136 A | * | 6/1993 | Rasmussen et al. | 380/266 |
| 5,351,296 A | * | 9/1994 | Sullivan | 705/70 |
| 5,588,052 A | * | 12/1996 | Murata et al. | 379/283 |
| 5,913,189 A | * | 6/1999 | Lee et al. | 704/226 |
| 6,081,593 A | * | 6/2000 | Kim | 379/406.08 |
| 6,151,514 A | * | 11/2000 | Cheng et al. | 455/564 |
| 6,157,712 A | * | 12/2000 | Wikstrom | 379/386 |
| 6,912,275 B1 | * | 6/2005 | Kaplan | 379/88.2 |
| 6,996,213 B1 | | 2/2006 | De Jong | |
| 7,145,991 B2 | | 12/2006 | De Jong | |
| 2003/0112978 A1 | * | 6/2003 | Rodman et al. | 380/277 |
| 2004/0218739 A1 | * | 11/2004 | Nicol | 379/93.33 |

OTHER PUBLICATIONS

Schulzrinne, H., et al., "RTP: A Transport Protocol for Real-Time Applications", *Request for Comments: 1889*, (Network Working Group, Audio-Video Transport Working Group), (Jan. 1996), 71 pgs.

* cited by examiner

*Primary Examiner*—Gerald Gauthier
(74) *Attorney, Agent, or Firm*—Schwegman, Lundberg & Woessner, P.A.

(57) ABSTRACT

Systems and methods provide for embedding white noise signals representing DTMF digits into a voice data stream.

21 Claims, 4 Drawing Sheets

SYSTEMS AND METHODS TO SEND AND RECEIVE ENCRYPTED DTMF DIGITS IN A DATA FLOW

FIELD

The embodiments of the invention relate generally to data communications and more particularly to sending and receiving DTMF digits in a digital data flow.

BACKGROUND

As network bandwidth and transmission speed increases, it is becoming more common for individuals and corporations to send and receive voice data over packet switched networks such as the Internet or other IP (Internet Protocol) based networks rather than through the traditional circuit switched telephone system. The use of such packet switched networks to send and receive voice or audio data is referred to as VoIP (Voice over IP), IP Telephony, or Internet telephony. VoIP is typically thought to provide benefits such as lower per-call costs, lower infrastructure costs, and easier expandability.

In addition to voice data, VoIP connections may send other audio data such as DTMF (Dual Tone Multi-Frequency) data. DTMF is the system used by touch-tone telephones to indicate which key on a telephone keypad has been pressed. DTMF assigns a specific frequency (consisting of two separate tones) to each key so that it can easily be identified by a receiving system. DTMF data may be used as part of an interactive voice response system in which a user responds to voice prompts by pressing keypads to navigate through various options provided by the system. For example, a user may hear bank account information by calling a number provided by the bank, and pressing keypad numbers in response to prompts to provide account numbers and access codes. Similar systems such as payment systems allow users to enter credit card numbers to make payments over the phone.

Unfortunately, due to the nature of network data transmission, it may be possible for third parties to intercept or "snoop" audio data while it is transmitted on the network. For example, a third party may be able to determine a user's account number and access codes, credit card information, or other private data by scanning audio data transmitted over a network for DTMF tones present in the data. The third party may then use the DTMF data to make unauthorized access to a VoIP user's financial or other private data. While it is possible to encrypt all VoIP data for a particular session, this typically requires more processing power than is desirable in the VoIP environment. As a result, there is a need in the art for the embodiments of the present invention.

DETAILED DESCRIPTION

In the following detailed description of exemplary embodiments of the invention, reference is made to the accompanying drawings that form a part hereof, and in which is shown by way of illustration specific exemplary embodiments in which the inventive subject matter may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the inventive subject matter. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

Figure 1:
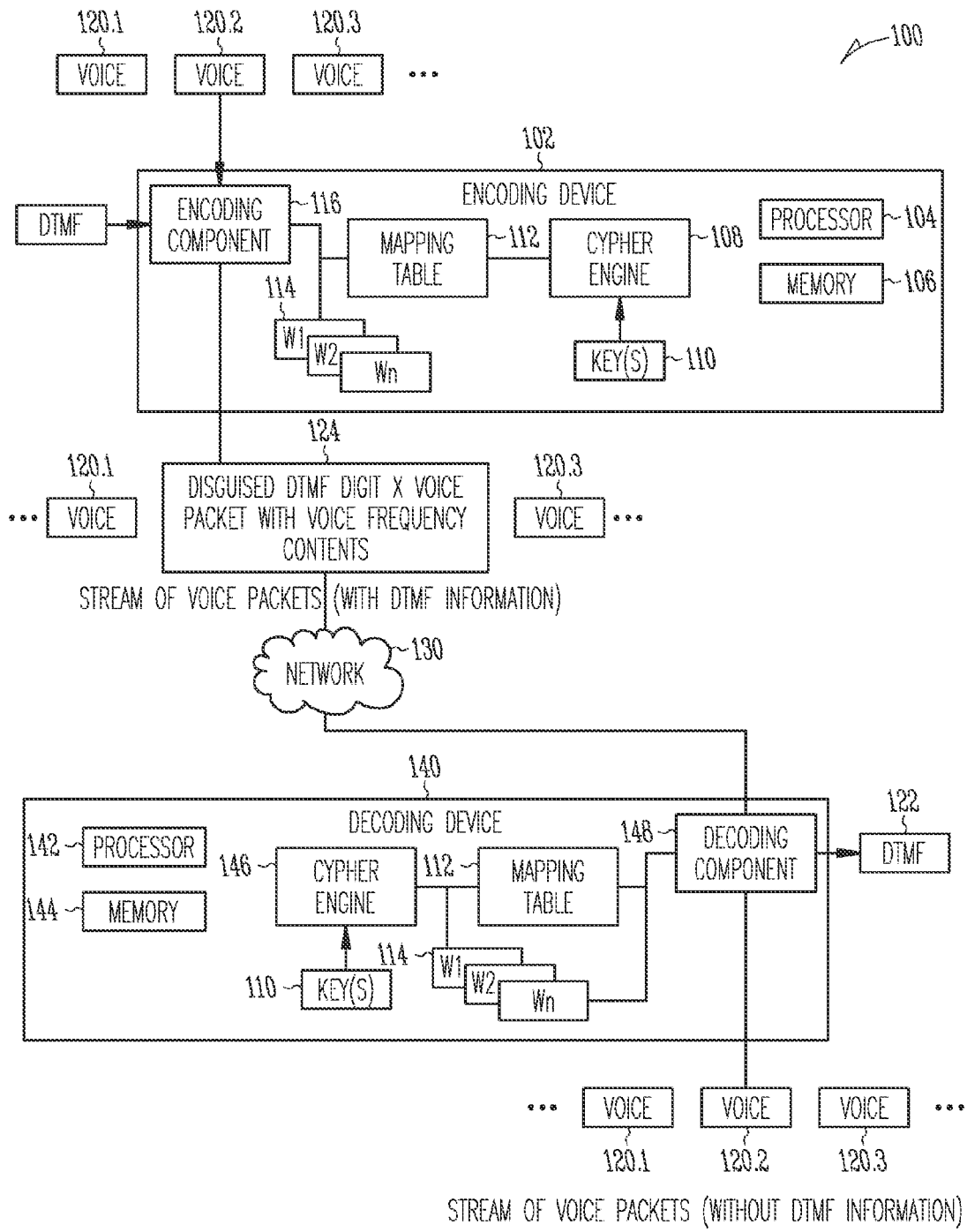
FIG. 1 is a block diagram showing hardware and software components of a system incorporating embodiments of the invention.

FIG. 1 is a block diagram of the major components of a hardware and software operating environment 100 incorporating various embodiments of the invention. In some embodiments of the invention, operating environment 100 includes encoding device 102 and decoding device 140 communicably coupled by a network 130.

Network 130 may include a local area network, a wide area network, a corporate intranet, and/or the Internet. The embodiments are not limited to any particular type of network.

Encoding device 102 may be any device that can send voice data and DTMF tones. Generally such devices may include VoIP telephone handsets, VoIP adapters for traditional telephone handsets, personal computers, server computers, mainframe computers, laptop computers, portable handheld computers, set-top boxes, intelligent appliances, personal digital assistants (PDAs), cellular telephones and hybrids of the aforementioned devices. In some embodiments, encoding device includes a processor 104 and memory 106 that may store and execute a cipher engine 108 (also referred to as an encryption engine) and encoding component 116.

Processor 104 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. In some embodiments of the invention, processor 104 may be a processor in the Pentium®, Celeron® or Itanium® family of processors available from Intel Corporation, Santa Clara, Calif. However, the embodiments of the invention are not limited to any particular type of processor. Although only one processor 104 is shown, multiple processors may be present in encoding device 102.

Cipher engine 108 uses one or more keys 110 to produce an output sequence based on input keys 110. The output of cipher engine 108 may be used to build multiple white noise signals 114. In some embodiments, sixteen different white noise signals may be built, one for each DTMF tone. In alternative embodiments more than sixteen white noise signals may be built, and the system selects sixteen for including in mapping table 112. The output of cipher engine 108 may be used to generate mapping table 112 that is used to map the multiple white noise signals 114 to DTMF tones.

In some embodiments, each of white noise signals 114 is a random signal with a flat power spectral density. In other words, the signal's power spectral density has substantially equal power in any band, at any center frequency, having a given bandwidth. In some embodiments, the different white noise signals have different power attributes.

Encoding component 116 receives voice data 120. Voice data 120 comprises data packets containing digitized voice or other audio signals. In some embodiments, the voice data 120 are encoded in accordance with the Real-time Transport Protocol (RTP) which defines a packet format for delivering audio and video over the IP networks such as the Internet. Further details on RTP may be found in RFC (Request For Comments) 1889, first published in 1996 by the Audio-Video Transport Working Group of the IETF (Internet Engineering Task Force).

As voice data 120 is being processed, a DTMF event 122 may be received by encoding component 116. The DTMF event may be mapped to a corresponding white noise signal 114 using mapping table 112. The white noise signal representing the DTMF event is then embedded in the current voice packet 124. The encoding device 102 then transmits the voice packet 124 to decoding device 140 over network 130.

Decoding device 140 may be any type of device that can receive and voice or audio data. As with encoding device 102, such devices may include VoIP telephone handsets, VoIP adapters for traditional telephone handsets, personal computers, server computers, mainframe computers, laptop computers, portable handheld computers, set-top boxes, intelligent appliances, personal digital assistants (PDAs), cellular telephones and hybrids of the aforementioned devices. In some embodiments, decoding device 140 includes a processor 142 and memory 146 that may store and execute a cipher engine 108 and decoding component 148.

Like processor 104, processor 142 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. In some embodiments of the invention, processor 104 may be a processor in the Pentium®, Celeron® or Itanium® family of processors. However, the embodiments of the invention are not limited to any particular type of processor. Although only one processor 142 is shown, multiple processors may be present in encoding device 102.

Cipher engine 146 in decoding device 140 uses the same keys 110 as encoding device 102 to produce an equivalent output sequence based on input keys 110. The output of cipher engine 146 may be used to build the same mapping table 112 and multiple white noise signals 114 as those in encoding device 102. It is desirable that cipher engine 146 be the same type as cipher engine 108 in order to insure that the same output is generated from equivalent input. However, cipher engine 146 may be different from cipher engine 108 as long as the same output is generated from the same input.

Decoding component 148 receives voice data 120 from network 130. The voice data packets are examined to determine if they contain any of white noise signals 114. If so, the white noise signal is determined, and the corresponding DTMF tone 122 is generated. The white noise signal may be removed from the voice data and delivered to the appropriate entity for further processing.

Further details on the operation of system 100 are provided below with reference to FIGS. 2, 3 and 4.

Figure 2:
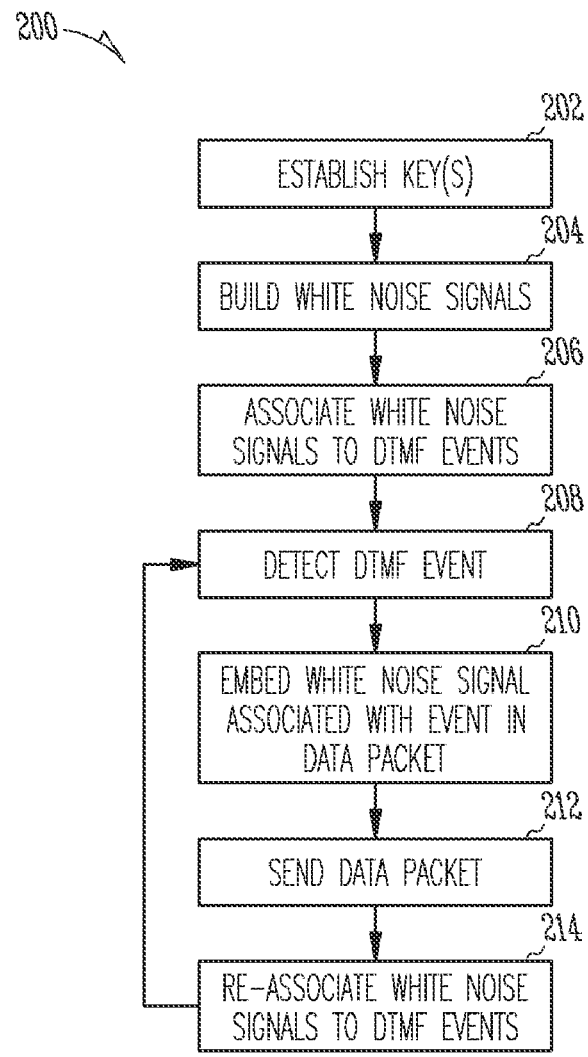
FIG. 2 is a flowchart illustrating a method for sending DTMF data in a data stream according to embodiments of the invention.
Figure 3:
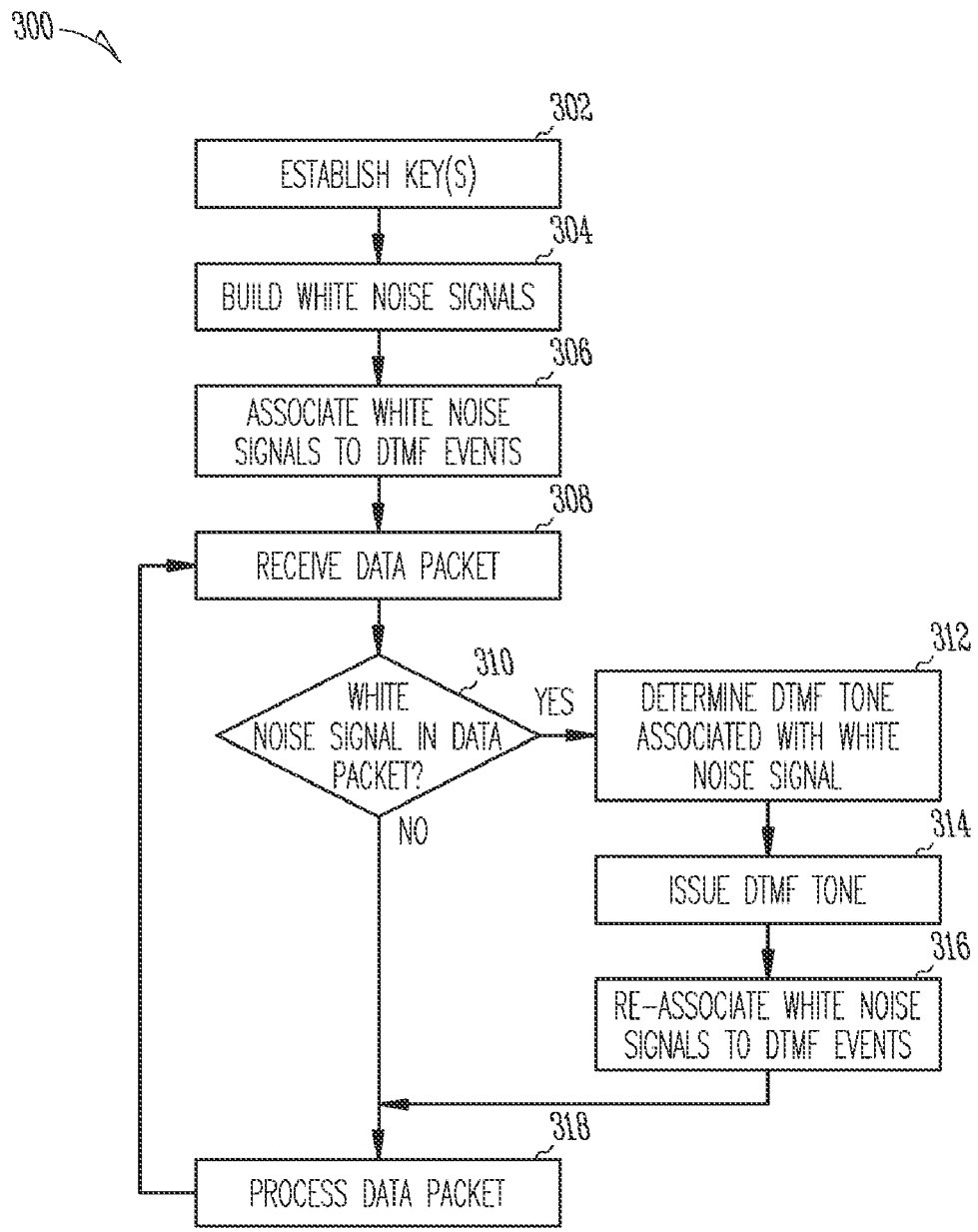
FIG. 3 is a flowchart illustrating a method for receiving DTMF data in a data stream according to embodiments of the invention.
Figure 4:
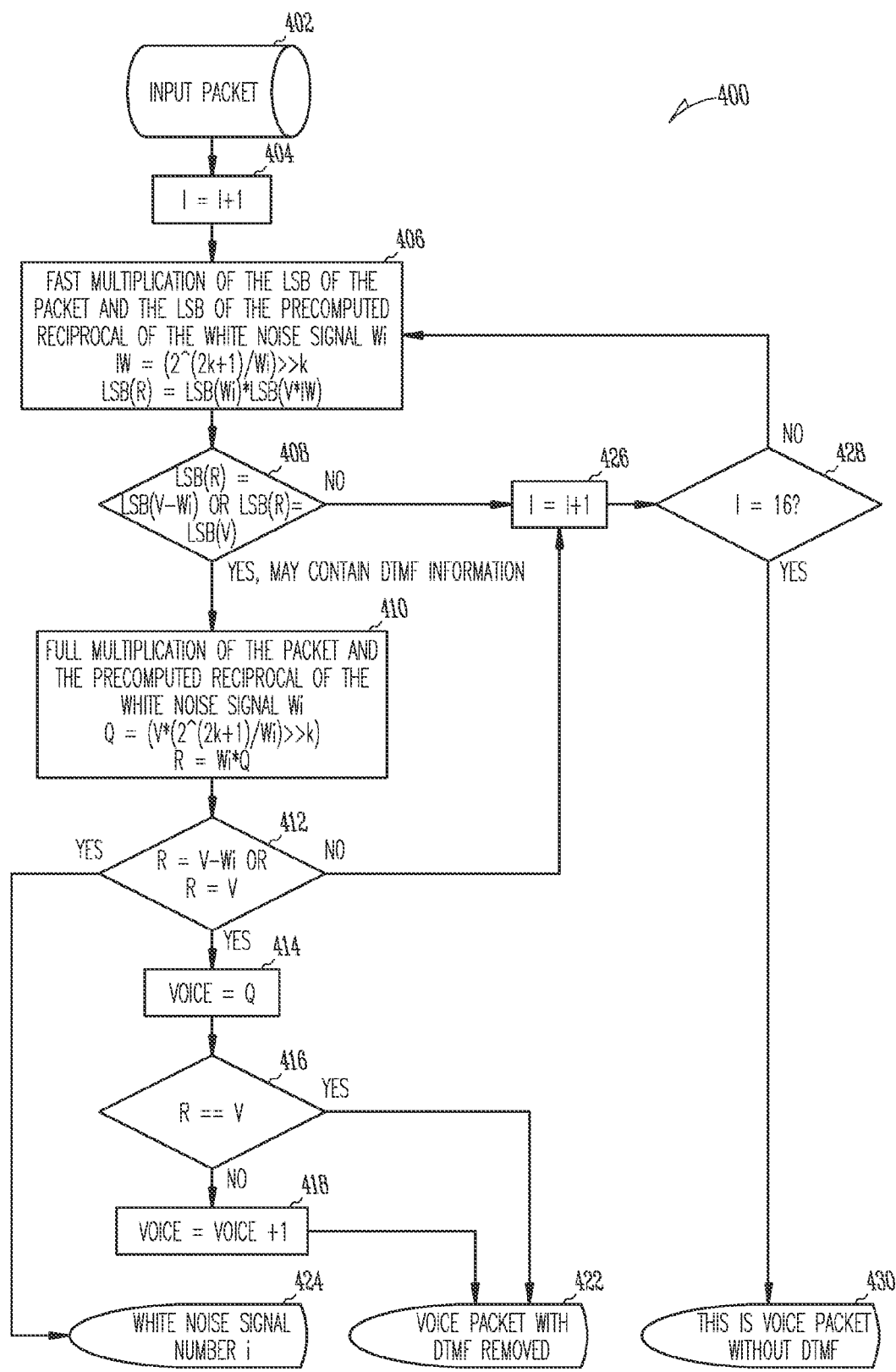
FIG. 4 is a flowchart illustrating a method for determining if DTMF data exists in a data stream according to embodiments of the invention.

FIGS. 2, 3 and 4 are flowcharts illustrating methods for sending and receiving data including embedded DTMF data. The methods may be performed within an operating environment such as that described above with reference to FIG. 1. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, hard disk, flash memory etc.). The methods illustrated in FIGS. 2, 3A and 2B are inclusive of the acts performed by an operating environment executing an exemplary embodiment of the invention.

FIG. 2 is a flowchart illustrating a method for sending DTMF data in a data stream according to embodiments of the invention. The method begins by establishing one or more keys for use by a cipher engine 108 (block 202). In some embodiments, the keys are exchanged between encoding device 102 and decoding device 140 so that each device is using the same input keys in order to generate the same output from cipher engine 108. In alternative embodiments the keys may be established by configuration data on encoding device 102 and decoding device 140.

Next, the encoding device uses the output of the cipher engine to build multiple white noise signals (block 204). The output of the cipher engine may be used to establish parameters such as the frequencies and amplitudes used in each white noise signal. As noted above, some embodiments build sixteen white noise signals, one for each DTMF tone. However, alternative embodiments may build more than sixteen white noise signals. It is desirable that the white noise signals comply with certain properties in order to minimize their impact on the audio signal. For example, it is desirable that the white noise signals have low power in the audible bandwidth. It is also desirable that the white noise signals have good symmetry in the frequency domain, with no major phase shift introduced in the time domain. In some embodiments, the white noise signals may be built such a way that under their digital form, for any i !=j, Wi does not divide Wj (where Wi represents an individual white noise signal). While there is no need for the white noise signals (Wi) to be a prime number nor have the same length in bits, or have any strong cryptographical quality, in alternative embodiments the white noise signals Wi may be cryptographically strong prime numbers.

In addition, it is desirable that the white noise signal length and amplitude be small enough compared to the amplitude of a typical voice or audio signal such that the white noise signal does not cause saturation of the voice or audio data. In some embodiments, the white noise signals are ten milliseconds in duration, resulting in an eighty byte addition to the voice data packet.

In some embodiments, the encoding device uses the output of the cipher engine to associate sixteen of the white noise signals with the sixteen DTMF events (block 206). In some embodiments, a mapping table may be used, with entries in the table selected according to the output of the cipher engine. However, those of skill in the art will appreciate that alternative mechanisms may be employed to associate white noise signals with DTMF events and that such mechanisms are within the scope of the invention. For example the mapping could be according to the order of white noise signal generation.

Next, the system detects a DTMF event (block 208). The DTMF event may be the result of a telephone keypad press. Alternatively, the DTMF event may be software generated.

The system then selects the white noise signal associated with the DTMF event, and embeds the selected signal in the current voice data packet (block 210). In some embodiments, the selected white noise signal is embedded in the voice data by convolving the white noise signal with the current audio data. Convolution in the time domain is equivalent to multiplication in the frequency and hence the audio frequency components may be multiplied by the white noise signal component. Thus for a DTMF digit i and the white noise Wi currently mapped to it, the current audio packet A is multiplied by the selected white noise signal Wi in order to build an output packet V:

$$V=Wi*A$$

The length of the output packet is the sum of the length of the input packet and the length of the white noise signal, and may be coded into two output packets with the same frequency content as the input audio packet.

In some embodiments, the system creates a new association of the white noise signals with DTMF events (block 212). In some embodiments, each DTMF event causes a new iteration of the cipher engine, which modifies the DTMF-white noise mapping tables. This technique may be used so that the same DTMF digit will not be encoded twice with the same white noise Wi, thereby making it difficult for third parties to detect DTMF digits embedded in a voice or audio data stream.

The system then transmits the resultant output packets (block 214). In some embodiments, the output packets conform to the RTP protocol.

In some embodiments, the system embeds a white noise signal in each output data packet. When a DTMF event occurs, one of the associated white noise signals is embedded in the current voice packet. If a DTMF event has not occurred, one of the white noise packets that is not currently associated with a DTMF event may be embedded. This is desirable because it increases the difficulty for a third party to discover that DTMF digits are embedded as white noise in the voice/audio data.

In some embodiments, the new association includes generating a new pool of white noise signals to be associated with DTMF events.

The system then returns to block 208 to await the next DTMF event. Voice/audio data packets will continue to be processed.

FIG. 3 is a flowchart illustrating a method for receiving DTMF data in a voice/audio data stream according to embodiments of the invention. In some embodiments, the receiving system establishes keys (block 302), builds white noise signals (block 304) and associates the white noise signals to DTMF events (block 306) as described above in blocks 202, 204 and 206 respectively.

Next, the system receives a voice/audio data packet (block 308). The data packet may conform to the RTP protocol. The system analyzes the data packet to determine if a white noise signal is present in the data packet (block 310). In some embodiments, a packet lookup operation is used to determine whether one of the currently mapped white noises is present within the signal. This operation is described in further detail with reference to FIG. 4 below.

If a white noise signal is detected, the system proceeds to determine which DTMF tone is associated with the detected white noise signal (block 312). The associated DTMF tone is issued or DTMF event occurs (block 314).

In some embodiments, when a DTMF digit is detected, the new iteration of the cipher engine is triggered, resulting in a new association of white noise signals to DTMF events (block 316). The system removes the white noise signal and proceeds to process the voice data (block 318).

If none of the generated white noise signals are detected in the input data packet at block 310, the system assumes that no DTMF digit is present and processes the voice packet as it normally would (block 318).

FIG. 4 is a flowchart illustrating a method for determining if a white noise signal representing a DTMF digit exists in a data stream according to embodiments of the invention. In some embodiments, the system checks for the presence of one of the currently mapped white noise signals Wi in the audio data packet V. In other words the system attempts to find i where (V==0) mod Wi. In some embodiments, the computation of a remainder for the modulus operation can be done using a multiplication, a shift and a subtraction. For example, If k is the length of the white noise signal Wi, then $$V \% Wi$$

is equivalent to:

$$V-Wi*((V*[2^{2k+1}/Wi])>>k) \text{ which gives the results } 0$$
$$\text{or } Wi \text{ if and only if } (V \% Wi)==0$$

The system begins by receiving the current voice packet V (block 402). The current candidate white noise signal index i is set to 1 (block 404).

The system then proceeds to precompute certain values for the current white noise signal candidate Wi (block 406). In some embodiments, the reciprocal values $[2^{2k+1}/Wi]$ are precomputed.

Additionally, it is not necessary to process the full multiplications. In some embodiments, the LSB (Least Significant Bits) for the remainder R are precomputed as:

$$IW=(2^{(2k+1)}/Wi)>>k$$

$$LSB(R)=LSB(Wi)*LSB(V*IW)$$

where IW represents a precomputed reciprocal value for Wi.

In some embodiments, a lookup with the LSB (least significant bits) is used to determine whether or not a packet contains the expected white noise value (block 408). Thus in some embodiments, if the LSB(R)=LSB(V−W) or LSB(R)=LSB(V), then the packet is considered as a candidate for containing the current white noise signal representing a DTMF digit. The system proceeds to perform a full modular reduction of the current white noise signal and the current audio packet data (block 410). In some embodiments, the modular reduction may be computed as:

$$Q=(V*(2^{(2k+1)}/Wi)>>k)$$

$$R=Wi*Q$$

where Q is a close approximation of the quotient and R is a close approximation of the remainder.

If the resultant R equals the current audio data V or V−Wi, then the system determines that the packet contains the white noise signal Wi (block 424).

As noted above, Q and R may be close approximations due to possibility that residual error may be introduced as a result of the calculations performed at block 410. The system then executes actions designed to remove the approximation and retrieve exact values for Q and R. At block 414, the system initializes the output voice packet to Q as calculated above (block 414). The system then check to see if the remainder R is equal to V (block 416). If so, the voice value is exact and is provided as the voice data (block 422).

Otherwise, the quotient was inexact, and it is adjusted to be exact by adding 1 to the voice value (block 418). This value is then returned as the voice data (block 422)

The system then provides a voice packet with the current white noise signal removed (block 422)

If the check at block 408 determines that the data packet does not contain the current candidate white noise signal, the system increments the white noise index to get the next candidate white noise signal Wi (block 426). If all sixteen candidates have been checked (block 428), the system determines that the current voice data packet does not contain a white noise signal (block 430). Otherwise, the system returns to block 406 to precompute values for the next candidate Wi. Blocks 408-426 are then executed for the next candidate Wi.

Thus in general, the method illustrated in FIG. 4 may be used to quickly check if the input packets are likely to contain white noise information representing a DTMF digit, and filter out the packets which contains only voice data. If a packet is detected that could contain one of the white noise signals, a complete modular reduction is run.

Systems and methods for stegonagraphically hiding DTMF data in voice or audio data have been described. The embodiments of the invention provide advantages over previous systems. For example, the systems and methods of various embodiments of the invention hide DTMF data in voice or audio data streams to secure the DTMF data without the need to encrypt all of the voice or audio data and without substantially affecting the frequency contents of the audio signal.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that the inventive subject matter be limited only by the following claims and equivalents thereof.

What is claimed is:

1. A method for execution by one or more processors, the method comprising:
    generating a plurality of white noise signals according to one or more encoding keys;
    associating the plurality of white noise signals to a plurality of DTMF events;
    detecting by the one or more processors a DTMF event of the plurality of DTMF events; and
    embedding by the one or more processors one of the plurality of white noise signals associated with the DTMF event into a data packet in place of a DTMF tone associated with the DTMF event.

2. The method of claim 1, further comprising re-associating the plurality of white noise signals to the plurality of DTMF events after embedding one of the plurality of white noise signals such that a new association of white noise signals to DTMF events is formed.

3. The method of claim 1, wherein the plurality of white noise signals are generated according to the output of an encryption engine.

4. The method of claim 3, further comprising sending one or more key values used to initialize the encryption engine to a receiving system.

5. The method of claim 3, further comprising receiving one or more key values to initialize an encryption engine on the receiving system.

6. The method of claim 1, wherein embedding one of the white noise signals includes convolving one of the white noise signals with the audio data.

7. A method for execution by one or more processors, the method comprising:
    generating a plurality of white noise signals according to one or more encoding keys;
    associating the plurality of white noise signals to a plurality of DTMF tones;
    receiving by the one or more processors a data packet;
    determining by the one or more processors the presence of a white noise signal from the plurality of white nose signals in the audio data packet;
    if the white noise signal is present, then issuing a DTMF tone associated with the white noise signal.

8. The method of claim 7, further comprising re-associating the plurality of white noise signals to the plurality of DTMF tones upon determining the presence of the white noise signal such that a new association of white noise signals to DTMF events is formed.

9. The method of claim 7, wherein the plurality of white noise signals are generated according to the output of an encryption engine.

10. The method of claim 9, further comprising sending one or more key values used to initialize the encryption engine to a sending system.

11. The method of claim 9, further comprising receiving one or more key values to initialize an encryption engine on the sending system.

12. The method of claim 7, wherein detecting the presence of one of the white noise signals includes comparing the least significant bits of the data packet with a table of least significant bits of values computed from the white noise signals.

13. A system comprising:
    a processor and at least one memory;
    a data structure in the memory to associate a plurality of white noise signals with a plurality of DTMF tones;
    a cipher engine to read one or more keys and to generate a set of values used to determine the association of the plurality of white noise signals with the DTMF tones in the data structure; and
    an encoding component executed by the processor to detect a DTMF event and to embed an associated white noise signal into a data packet.

14. The system of claim 13, wherein the encoding component is further operable to reset the data structure to a second association the plurality of white noise signals to the plurality of DTMF events upon detecting the DTMF event.

15. The system of claim 13, wherein the cipher engine is further operable to generate a set of values used to generate the plurality of white noise signals.

16. A machine-readable medium having stored thereon machine executable instructions for performing a method, the method comprising:
    generating a plurality of white noise signals according to one or more encoding keys;
    associating the plurality of white noise signals to a plurality of DTMF events;
    detecting a DTMF event in the plurality of DTMF events; and embedding one of the plurality of white noise signals associated with the DTMF event into a data packet.

17. The machine-readable medium of claim 16, wherein the method further comprises re-associating the plurality of white noise signals to the plurality of DTMF events after embedding one of the plurality of white noise signals such that a new association of white noise signals to DTMF events is formed.

18. The machine-readable medium of claim 16, wherein the plurality of white noise signals are generated according to the output of an encryption engine.

19. The machine-readable medium of claim 18, wherein the method further comprises sending one or more key values to used to initialize the encryption engine to a receiving system.

20. The machine-readable medium of claim 18, wherein the method further comprises receiving one or more key values to initialize the encryption engine.

21. The machine-readable medium of claim 16, wherein embedding one of the white noise signals includes convolving one of the white noise signals with the audio data.

* * * * *

UNITED STATES PATENT AND TRADEMARK OFFICE
CERTIFICATE OF CORRECTION

PATENT NO.        : 7,676,027 B2                                                  Page 1 of 1
APPLICATION NO.   : 11/172628
DATED             : March 9, 2010
INVENTOR(S)       : Pierre Laurent et al.

It is certified that error appears in the above-identified patent and that said Letters Patent is hereby corrected as shown below:

In column 8, line 18, in Claim 7, delete "nose" and insert -- noise --, therefor.

In column 8, line 54, in Claim 14, after "association" insert -- of --.

Signed and Sealed this

Eleventh Day of May, 2010

David J. Kappos
*Director of the United States Patent and Trademark Office*